US005646669A

United States Patent [19]

Yamada et al.

[11] Patent Number: 5,646,669

[45] Date of Patent: Jul. 8, 1997

[54] CORROSION RESISTANT ELECTROSTATIC RECORDING HEAD WITH MULTIPLE LAYERS

[75] Inventors: Tetsuo Yamada; Toshihide Tanaka; Satoru Hirosaki; Koji Udagawa; Yumiko Komori, all of Ebina, Japan

[73] Assignee: Fuji Xerox Co., Ltd., Tokyo, Japan

[21] Appl. No.: 136,762

[22] Filed: Oct. 15, 1993

[30] Foreign Application Priority Data

Oct. 22, 1992 [JP] Japan .................................... 4-284493

[51] Int. Cl.$^6$ ................................ B41J 2/415; B41J 2/41; G11B 3/00

[52] U.S. Cl. ........................... 347/127; 347/112; 347/128

[58] Field of Search .................................... 347/112, 127, 347/128, 141, 145; 430/59; 346/155, 159

[56] References Cited

U.S. PATENT DOCUMENTS

| | | | |
|---|---|---|---|
| 4,160,257 | 7/1979 | Carrish | 347/127 |
| 4,408,214 | 10/1983 | Fotland et al. | 347/127 |
| 4,628,227 | 12/1986 | Briere | 347/127 |
| 5,116,703 | 5/1992 | Badesha et al. | 430/59 |
| 5,270,741 | 12/1993 | Hosaka et al. | 347/112 |

FOREIGN PATENT DOCUMENTS

| | | |
|---|---|---|
| 54-78134 | 6/1979 | Japan . |
| 63-53056 | 3/1988 | Japan . |
| 2-4541 | 1/1990 | Japan . |

OTHER PUBLICATIONS

J. R. Rumsey et al.; *Journal of Imaging Technology;* "Ion Printing Technology"; Jun., 1986; pp. 144–151.

K. Masuda; *SPIE vol. 1252 Hard Copy and Printing Technologies;* "Aperture alignment effect on ionography head"; 1990; pp. 137–142.

*Primary Examiner*—Benjamin R. Fuller
*Assistant Examiner*—Raquel Yvette Gordon
*Attorney, Agent, or Firm*—Oliff & Berridge

[57] ABSTRACT

An electrostatic recording head comprises an insulating substrate having a builtup structure thereon. The builtup structure includes, in the following order, a plurality of dielectric electrode strips having portions which are arranged in parallel to and kept away from one another, a first insulating layer, a plurality of discharge electrode strips each extending to intersect with the respective portions of the dielectric electrode strips, a second insulating layer having a plurality of openings to form part of an ion generating space region at individual intersected portions of said discharge electrode strips and said dielectric electrode strips, and a screen electrode which is provided to complete each ion generating space region in association with the second insulating layer and has a plurality of openings, through which ions are passed, corresponding to the respective ion generating space regions. The screen electrode is made of a member which is selected from the group consisting of metals, noble metals and alloys mainly composed of these metals and which has a melting point not lower than 1500° C. Alternatively, the screen electrode may be made of a core member and a surface layer which is made of the above metal member, or an oxidation-resistant material such as an inorganic compound, a polymer or a metal alkoxide polymer.

9 Claims, 4 Drawing Sheets

CORROSION RESISTANT ELECTROSTATIC RECORDING HEAD WITH MULTIPLE LAYERS

BACKGROUND OF THE INVENTION

1. Field of the Invention

This invention relates to the art of electrostatic recording and more particularly, to an electrostatic recording head of the type which comprises ion-generating units each including a dielectric electrode, a discharge electrode, an insulating layer sandwiched between the electrodes, and an ion flow control unit formed of a screen electrode.

2. Description of the Related Art

As an electrostatic recording head is known in which ions are generated or produced and images are recorded by use of the generated ions (U.S. Pat. No. 4,408,214).

FIGS. 6, 7 and 8 are, respectively, illustrative views of a known electrostatic recording head wherein FIG. 6 is a schematic sectional view of an essential part of the head, FIG. 7 is an illustrative sectional view of the head, taken along the line VII—VII of FIG. 6, and FIG. 8 is a schematic sectional view of the head, taken along the line VIII—VIII of FIG. 7.

As is particularly shown in FIGS. 6, 7 and 8, an electrostatic recording head Ho includes an insulating substrate 01, and dielectric electrode strips 02, a first insulating layer 03, discharge electrode strips 04, and a second insulating layer 05 formed on the substrate 01 in this order in such a way that the discharge electrode strips 04 are each arranged as being crossed with individual dielectric electrode strips 02 as shown in FIG. 7. The second insulating layer 05 has a space region 06, wherein ions are generated, at individual crossed portions of each discharge electrode strip 04 and each dielectric electrode strip 02.

A screen electrode 07 is further formed on the second insulating layer 05 of the insulating substrate 01. The screen electrode 07 has an opening 08 for ion passage corresponding to each space region 06. Thus, the crossed portions, space regions 06, and openings 08 are arranged in a matrix in the plan view of FIG. 7.

An ion generating unit includes an AC power supply 010, from which a high frequency high voltage is applied between the dielectric electrode strips 02 and the discharge electrode strips 04, and the elements or members indicated by the reference numerals 2 to 6. This application of voltages causes ions to be generated in individual space regions 06 as desired.

An ion flow control power supply 011 is connected to the respective dielectric electrode strips. From the power supply 011, an ion flow control potential is outputted thereby generating an electric field for the ion flow control between the discharge electrode strips 04 and the screen electrode 07. The ion flow control unit includes the ion flow control power supply 011 and the elements or members indicated by the reference numerals 04 to 07.

The respective electrodes 02, 04 and 07 are connected with a DC bias power supply 012 capable of generating a bias potential against an electrostatic latent image-bearing material (dielectric drum) not shown.

The electrostatic recording head having the arrangement as set out above operates as follows: the ions generated in intended space regions 06 by means of a high frequency high voltage transmission from the AC power supply 010 are accelerated or absorbed by application of an electric field established between the discharge electrode strips 04 and the screen electrode 07 to discharge a controlled ion flow is discharged thereby forming an electrostatic latent image according to image signals.

In the prior art electrostatic recording heads, the material for the screen electrode is usually nickel, stainless steels and the like (Japanese Laid-open Patent Application Nos. 54-78134, 63-53056 and 2-4541).

In this type of recording head, however, the electrodes are most likely to suffer corrosion by means of various active species generated during the course of the discharge. Especially, with the screen electrode, the considerable corrosion takes place at the side faces, which establish part of the ion generating space regions 06 and are thus invariably exposed to the active species, corrosion also takes place at the inner sides of the openings 08. In the worst case, the openings 08 may be clogged, resulting in a substantial lowering of ion output. These previously employed electrode materials are not satisfactory with respect to corrosion resistance.

SUMMARY OF THE INVENTION

It is accordingly an object of the invention to provide an electrostatic recording head that overcomes the drawbacks of the prior art.

It is another object of the invention to provide an electrostatic recording head having a screen electrode with improved corrosion resistance. Thus, the head is unlikely to undergo a change of output in relation to time.

The above objects can be achieved, according to one embodiment of the invention, by an electrostatic recording head including an insulating substrate having a builtup or multilayered structure thereon, the builtup or multilayered structure including, in the following order, a plurality of dielectric electrode strips having portions that are arranged in parallel to and separated from one another, a first insulating layer, a plurality of discharge electrode strips each extending to intersect with the respective portions of the dielectric electrode strips, a second insulating layer having a plurality of openings to form part of an ion generating space region at individual intersected portions of the discharge electrode strips and the dielectric electrode strips, and a screen electrode which is provided to complete each ion generating space region in association with the second insulating layer and has a plurality of openings, through which ions are passed, corresponding to the respective ion generating space regions. The head is characterized in that the screen electrode is made of a member selected from metals, noble metals and alloys mainly composed of these metals and having a melting point not lower than 1500° C.

The screen electrode may be fabricated by a variety of methods wherein the above metal member selected from metals, noble metals and alloys mainly composed of these metals as having a melting point not lower than 1500° C. is used. For instance, the screen electrode may be fabricated by subjecting, to chemical etching, discharging, punching or laser processing, metallic foils which are made of the above metal or noble metal or alloys thereof having a melting point not lower than 1500° C. and have a thickness of from 20 to 100 μm, preferably from 30 to 50 μm, thereby forming the openings. Alternatively, a flat mold having a number of projections at positions corresponding to the openings is provided, on which the above-mentioned metal is formed as a layer according to any known methods such as electroless plating, PVD, LPD (liquid phase deposition) and the like methods, followed by separation from the mold.

For the fabrication of the electrostatic recording head, any known methods may be used as long as that the screen electrode of the present invention is used.

Preferably, the metal used to form the screen electrode and having a melting point not lower than 1500° C. is a member selected from titanium, zirconium, tantalum, niobium, molybdenum, tungsten and alloys comprising a major proportion of the metals. Likewise, a preferred noble metal is selected from a member selected from gold, platinum, palladium and alloys comprising a major proportion thereof. It is preferred to use titanium or niobium.

According to another embodiment of the invention, there is also provided an electrostatic recording head of the type which comprises, like the first embodiment, an insulating substrate having a builtup structure thereon, the builtup structure including, in the following order, a plurality of dielectric electrode strips having portions which are arranged in parallel to and kept away from one another, a first insulating layer, a plurality of discharge electrode strips each extending to intersect with the respective portions of the dielectric electrode strips, a second insulating layer having a plurality of openings to form part of an ion generating space region at individual intersected portions of the discharge electrode strips and the dielectric electrode strips, and a screen electrode which is provided to complete each ion generating space region in association with the second insulating layer and has a plurality of openings, through which ions are passed, corresponding to the respective ion generating space regions. This embodiment is characterized in that the screen electrode is made of a conductive or semiconductive core member and a surface layer formed on the entire outer surfaces of the core member or formed at least on a surface of the core member which is facing the discharge electrodes and is exposed to charged particles and on inner surfaces of the individual openings, the surface layer being made of a material having a good oxidation resistance.

The materials for the conductive or semiconductive core member are not critical with respect to the type and may be ones to which a given voltage is applicable and which is able to be processed in a desired form. Various types of materials, not limited to metals are usable for this purpose.

The screen electrode of the type set out above may be fabricated by various methods if there can be made a structure which includes a conductive or semiconductive core member having such openings as defined hereinabove, and a surface layer having a good oxidation resistance and arranged to cover the entire surfaces of the core members therewith or at least a surface which is in face-to-face relation with the discharge electrodes and is exposed to charged particles and inside surface of the individual openings.

For instance, there is provided, as the core member of the screen electrode, a foil of a conductive metal such as nickel, stainless steels or the like or a foil of a semiconductor such as silicon, each having a thickness of from 20 to 100 μm, preferably from 30 to 50 μm. The foil is subjected to chemical etching, discharging, punching or laser processing to form openings. Alternatively, a flat mold having a number of projections at positions corresponding to the openings is provided, on which a conductive or semiconductive material is formed as a layer according to any known methods, such as electroless plating, PVD, LPD (liquid phase deposition and the like methods, followed by separation from the mold.

Next, a oxidation-resistant material is coated on the entire surfaces of the core member or at least on one side of the core member facing the discharge electrodes and thus exposed to charged articles and also on inside surfaces of the openings, thereby obtaining the screen electrode.

The oxidation-resistant materials may be coated by any known procedures provided that desired portions can be coated. Such coating procedures include electrolytic and electroless platings, electrophoresis, LPD, PVD, CVD, thermal oxidation treatment, spraying and the like methods.

In the above embodiment, it is preferred to use, as the material for the surface layer, metals, noble metals or alloys comprising a major proportion thereof, each having a melting point not lower than 1500° C. Examples of the metals having a melting point not lower than 1500° C. include titanium, zirconium, tantalum, niobium, molybdenum, tungsten and the like.

The noble metals include, for example, gold, platinum, palladium and the like.

It is preferred to use titanium or niobium.

Alternatively, the surface layer may be made of inorganic compounds or organic polymer compounds.

Examples of the inorganic compounds include oxides, nitrides and carbides of metals and semiconductive metals, and mixtures thereof. Specific examples include oxides, nitrides and carbides of silicon, aluminium, boron, zirconium, titanium, tantalum, magnesium, zinc and lead. Moreover, mixtures of these inorganic compounds or mixtures comprising a major proportion of these inorganic compounds may also be used.

The organic polymer compounds are polymers of organic monomers and include, for example, polyolefin resins having such a structure wherein part or all of the hydrogen atoms of ethylene units of polyethylene are substituted with other elements or atomic groups, polyamide resins, polyimide resins, polyester resins, polyurethane resins, polyether resins and the like. Usually, these resins are mixed with additives such as flame retardants, plasticizers and the like.

Although these resins may be used singly, the resins are used in combination or a plurality of the resins may be chemically bonded thereby providing polymer alloys.

Still alternatively, the surface layer of the screen electrode may be made of organic-inorganic composite materials such as metal alkoxide polymers. The metals of the metal alkoxides include, for example, silicon, aluminium, zirconium, titanium, boron and the like. The specific example of the organo-metallic compound is represent as following chemical structure;

$M(OR)_4$ or $(R{\cdot}O)nM—R'm$ wherein M represents one atom selected from the group consisting of silicon, aluminum, zirconium, Titanium; R represents an alkyl group having 1 to 5 carbon atoms; R' represents a residue of acetyl acetone, keto ester, glycol or hydroxy acid; and n and m each represents 0 or integer of 1 to 4, provided that the sum of n and m is 4.

The term organic-inorganic composite material is intended to mean a polymer having recurring units wherein metal or semiconductive metal atoms and carbon atoms are bonded and the materials may be called an inorganic polymer. Specific examples include those material that are obtained by providing a uniform solution of a metal alkoxide and subjecting the solution to hydrolysis and polymerization to obtain polymers. When the metal alkoxide is tetraethoxysilane (TEOS), siloxane polymers are obtained. For the coating, the sol obtained by the hydrolysis and polymerization is coated on a material to be coated by an appropriate procedure, followed by further reaction for gelation. If necessary, the coated gel may be thermally treated.

All the heads set forth in the above embodiments have a screen electrode whose corrosion resistance is good and the screen electrode is prevented from being clogged at individual openings.

PREFERRED EMBODIMENTS OF THE INVENTION

Embodiments of the invention are described with reference to the accompanying drawings, in which examples of the respective embodiments are also described.

Figure 1:
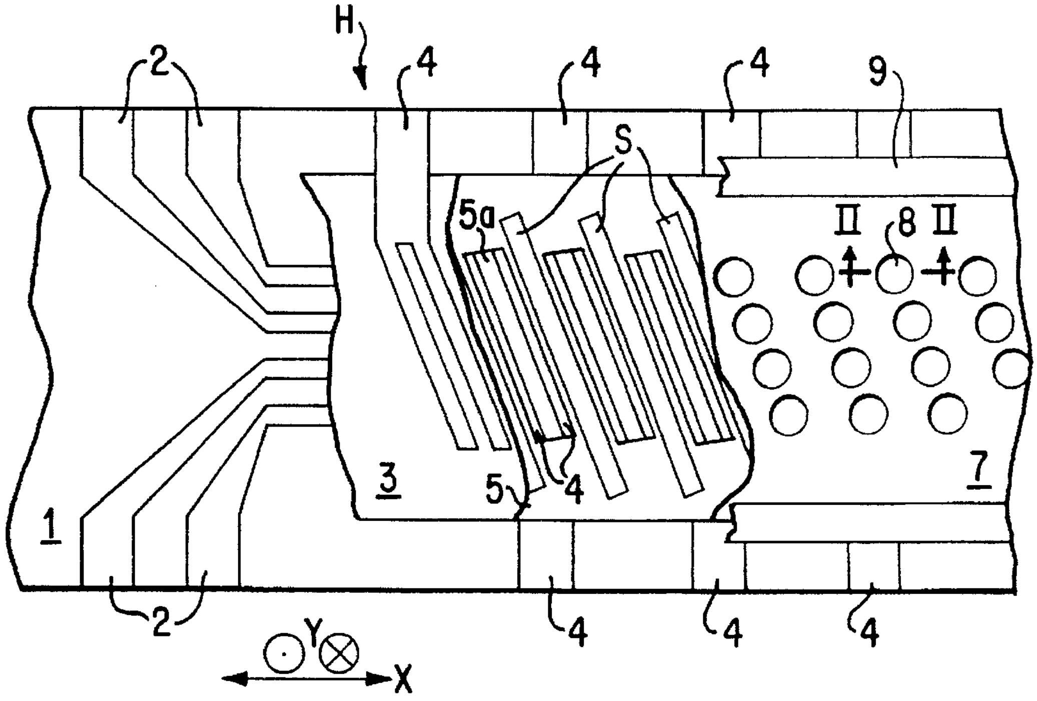
FIG. 1 is a schematic plan view of a fundamental structure of an electrostatic recording head according to one embodiment of the invention but partially broken to illustrate lower layers of the head structure.
Figure 2:
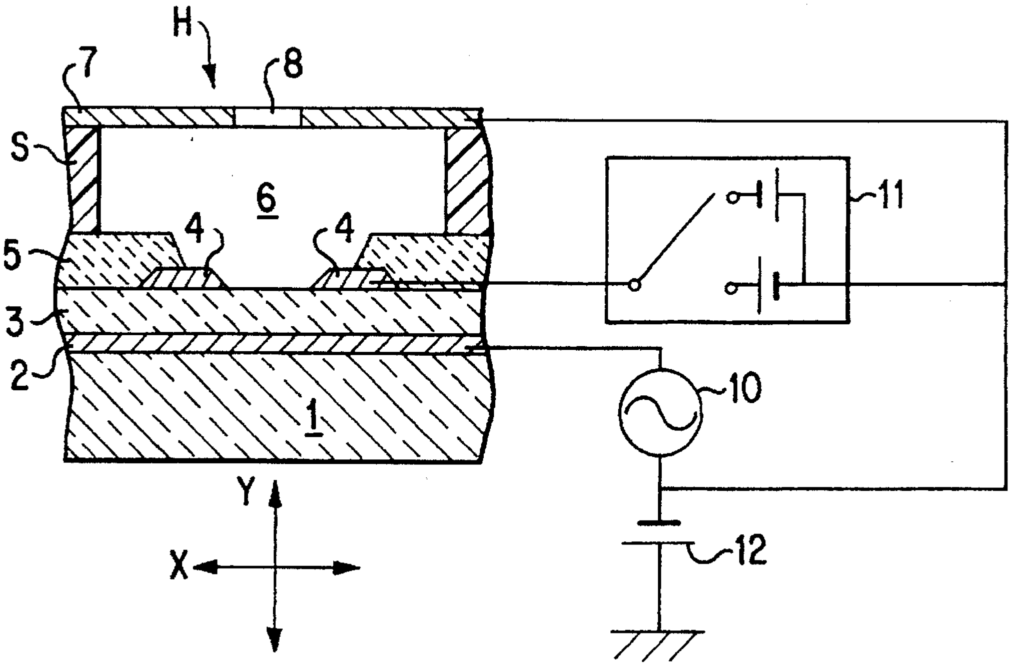
FIG. 2 is a sectional view of an essential part of the head, taken along the line II—II of FIG. 1, along with a power supply for driving the head.

Reference is now made to FIGS. 1 and 2 wherein FIG. 1 is a plan view of an electrostatic recording head H and FIG. 2 is a sectional view of an essential part of the head H, taken along the line II—II of FIG. 1 and a power supply circuit for driving the head H.

Figure 6:
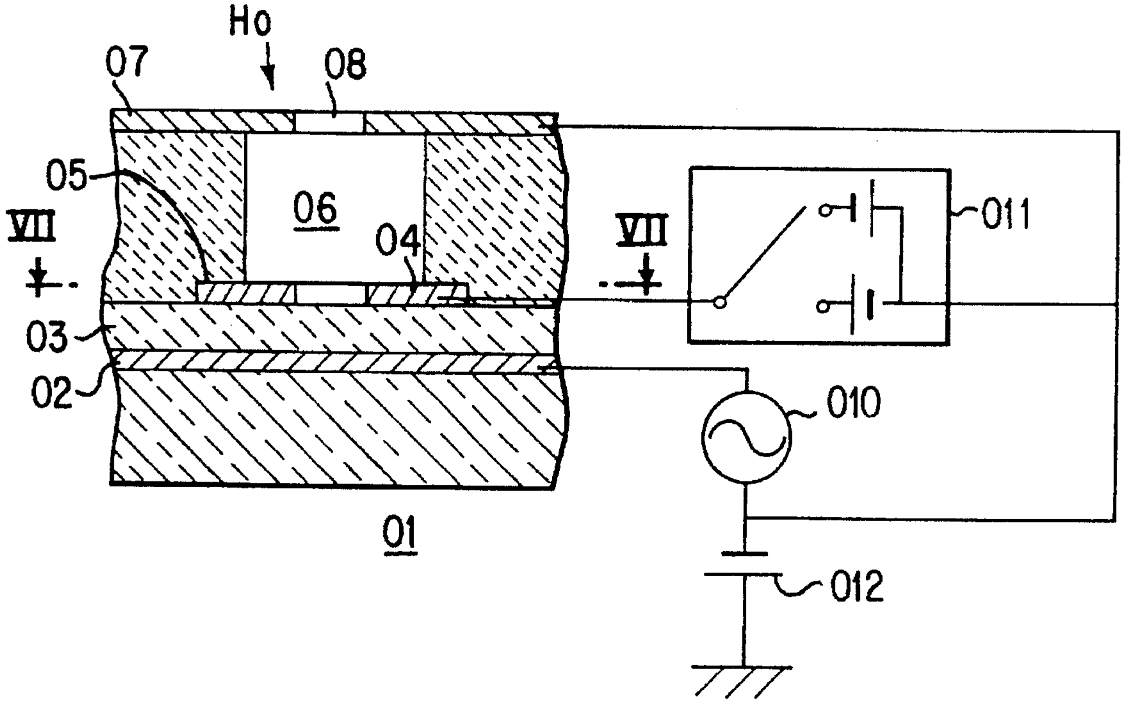
FIG. 6 is a sectional view of an essential part of a prior art electrostatic recording head along with a power supply circuit.
Figure 7:
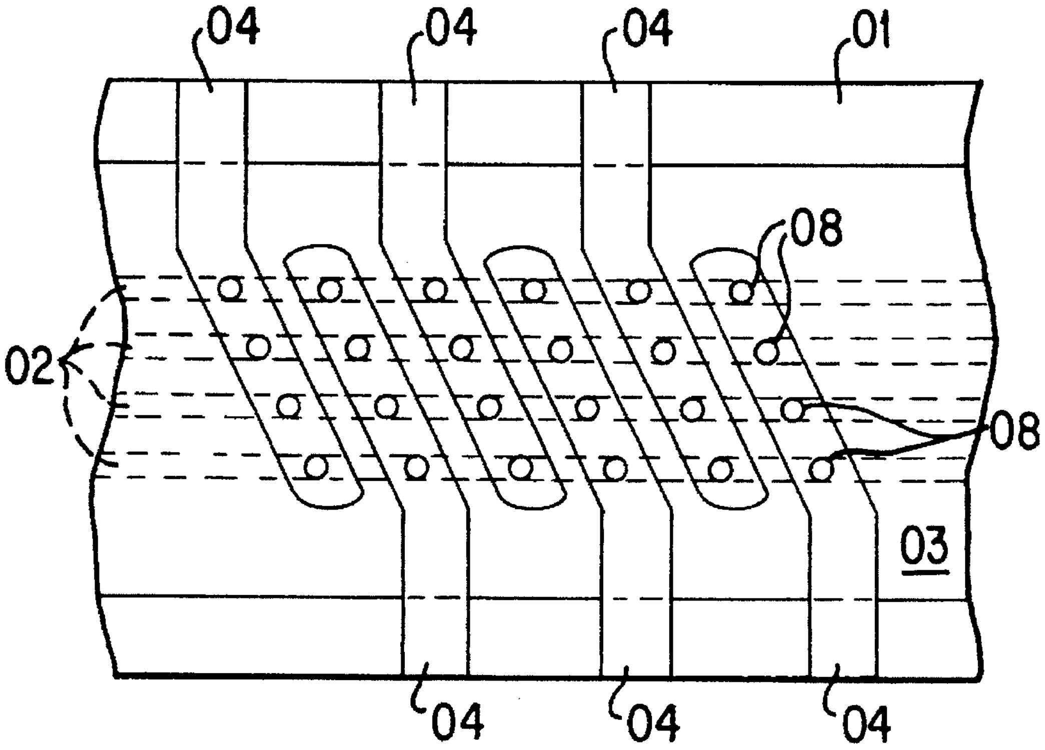
FIG. 7 is an illustrative sectional view of the head of FIG. 6, taken along the line VII—VII of FIG. 6.
Figure 8:
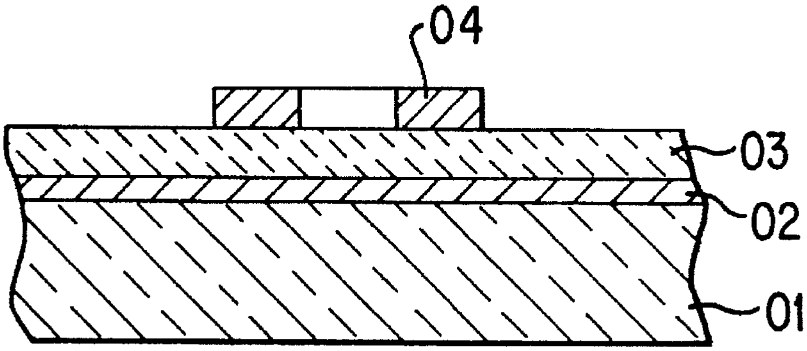
FIG. 8 is a schematic sectional view taken along the line VIII—VIII of FIG. 7.

It will be noted that the fundamental structure of the electrostatic recording head is similar to the known electrostatic recording head Ho shown in FIGS. 6 to 8. The reference numerals of FIGS. 1 and 2 indicate similar members or parts as indicated by reference numerals in FIGS. 6 to 8 except that the FIG. 0 is omitted from the reference numerals of FIGS. 6 to 8. In this sense, like reference numerals indicate like members or parts in all the figures. Accordingly, the fundamental structure of the recording head H according to the invention is described briefly in the following examples.

EXAMPLE 1

This example illustrates an electrostatic recording head H according to one embodiment of the invention with reference to FIGS. 1 and 2.

The head H has an alumina insulating substrate 1 having thereon a first dielectric electrode pattern that has a plurality of dielectric electrodes or electrode strips 2. The strips which are made of 2% platinum-containing silver and have portions arranged in parallel to and separated from one another as is particularly shown in FIG. 1. The dielectric electrode pattern may be formed by a known thick film printing procedure. The dielectric electrode strips 2 are covered with an insulating layer 3 made of borosilicate glass. A plurality of second discharge electrode forked strips 4 each made of nickel are formed on the insulating layer 3 in such a way that the forked electrode strips 4 are intersected with the first dielectric electrode strips 2 through the insulating layer 3. Further, a second insulating layer 5 made of lead oxide glass is formed on the discharge electrode strips 4. The second insulating layer 5 has elongated openings 5a so that inner sides of each forked electrode strip are exposed as shown in FIG. 2.

Elongated spaces S are provided on the second insulating layer 5 to establish given spaces between the discharge electrode formed strips 4 and a screen electrode 7 as shown in FIG. 2. The elongated spacer S is made, for example, of a fluorocarbon (Teflon) self-adhesive tape bonded on the second insulating layer. As a matter of course, if the second insulating layer 5 is made thick, the spacers S may not be formed.

The screen electrode 7 is formed on the spacers S to establish ion-generating space regions 6 as shown in FIG. 2. The screen electrode 7 is made of a gold foil with a thickness of 40 μm. The foil is fabricated as having openings with a diameter of 100 μm by discharging. The screen electrode is placed n the spacers S such that the center of each opening 8 and the center of each ion-generating space region 6 are exactly coincident with each other by registration using a fine adjustment having a manipulator device and a micrometer. Thereafter, a self-adhesive tape 9 is used to fixedly secure the gold foil 7.

In the above arrangement, the screen electrode 7 is provided on the second insulating layer 5 through spacers 5. This differs from the prior art head Ho of FIGS. 6 to 8 wherein the screen electrode 07 is formed directly on the thick second insulating layer 05. In the head H of the invention, the ion generating space regions 6 are arranged in a matrix and which are formed at intersections between the dielectric electrode strips 2 and the discharge electrode strips 4. The regions are established by the spacers S, the second insulating layer 5, the discharge electrodes strips 4, the insulating layer 3 and the screen electrode 7. The head H may be constructed similarly to like that of the prior art shown in FIGS. 6 to 8 wherein no spacer is used.

The operations of the head H are described. High frequency high voltage from an AC power supply 10 is applied to the head H; of FIG. 2 selectively between the dielectric electrode strips 2 and the discharge electrode strips 4. At a pulse ion flow control voltage from a DC bias power supply 11 is applied to the same time, the discharge electrode strips 4. A DC voltage from a DC bias power supply 12 is applied to the screen electrode 7 By the applications, creeping corona discharge is caused to occur in the space regions 6 distributed in the form of a matrix. The ions generated by the creeping corona discharge are accelerated or absorbed by the electric field established between the electrodes 4 and 7 by application of the voltages to the discharge electrodes 4 and the screen electrode 7, respectively. Thus, the ion flow is appropriately controlled to form an electrostatic latent image according to image signals.

In order to confirm the excellence of the head H of Example 1, the following test was conducted.

Pulses of a sine wave at 1 MHz and 1 kVp-p were applied between the dielectric electrode strips 2 and the discharge electrode strips 4 thereby causing discharge. DC voltages were, respectively, applied to the discharge electrode strips 4 and the screen electrode 7 so that of positive and negative ions generated, the negative ions were flown toward the screen electrode 7. The net application time of the high frequency voltage was set at 4 hours in total.

The screen electrode 7 of the electrostatic recording head which was driven under the above conditions was removed.

The area of the openings 8 was measured using a microscope that was provided with a CCD camera and an image analyzer. The relative opening ratio of the area of the openings after the application of the voltage and the area of the openings prior to the application (i.e. area of the openings after application of the load/area of the openings prior to the application ×100%). As a result, it was found that with the screen electrode made of gold, the electrode was deposited, at the side facing the ion-generating space regions 6, with a small amount of an oxide of nickel used to make the discharge electrode strips 4. However, the screen electrode underwent no oxidation and the relative opening ratio after the drive was substantially 100%. Thus, the openings were not clogged at all. It will be noted that for the elementary analyses in this test, there were used a field emission-type scanning microscope, an energy dispersed X-ray analyzer and the Auger electron spectrometer in combination.

EXAMPLE 2

The general procedure of Example 1 is repeated using platinum as the material for the screen electrode 7.

The confirmation test as the Example 1 revealed that the screen electrode 7 after the drive underwent no oxidation and the relative opening ratio after the drive was substantially 100% Thus no clogging taking place at the openings 8.

EXAMPLE 3

The general procedure of Example 1 is repeated using palladium as the material for the screen electrode 7.

The confirmation test as in Example 1 revealed that the screen electrode 7 after the drive underwent no oxidation and the relative opening ratio after the drive was substantially 100% Thus no clogging taking place at the openings 8.

EXAMPLE 4

The general procedure of Example 1 is repeated using, as the screen electrode 7, a 30 μm thick titanium (having a melting point of 1750° C.) foil which had been discharged thereby forming openings 8 with a diameter of 100 μm.

The confirmation test as in Example 1 revealed that the relative opening ratio after the drive was not lower than 90% and little clogging took place at the openings 8.

EXAMPLE 5

The general procedure of Example 1 is repeated using, as the screen electrode 7, a 30 μm thick niobium (having a melting point of 2460° C.) foil which had been discharged thereby forming openings 8 with a diameter of 100 μm.

The confirmation test as in Example 1 revealed that the relative opening ratio after the drive was not lower than 90% and little clogging took place at the openings 8.

EXAMPLE 6

The general procedure of Example 1 is repeated using, as the screen electrode 7, a 30 μm thick molibdenum (having a melting point of 2622° C.) foil which had been discharged thereby forming openings 8 with a diameter of 100 μm.

The confirmation test as in Example 1 revealed that the relative opening ratio after the drive was not lower than 90% and little clogging took place at the openings 8.

EXAMPLE 7

The general procedure of Example 1 is repeated using, as the screen electrode 7, a 30 μm thick tantalum (having a melting point of 3000° C.) foil which had been discharged thereby forming openings 8 with a diameter of 100 μm.

The confirmation test as in Example 1 revealed that the relative opening ratio after the drive was not lower than 90% and little clogging took place at the openings 8.

EXAMPLE 8

The general procedure of Example 1 is repeated using, as the screen electrode V, a 30 μm thick tungsten (having a melting point of 3382° C.) foil which had been discharged thereby forming openings 8 with a diameter of 100 μm.

The confirmation test as in Example 1 revealed that the relative opening ratio after the drive was not lower than 90% and little clogging took place at the openings 8.

EXAMPLE 9

Example 9 is described with reference to FIGS. 3 and 4.

Figure 3:
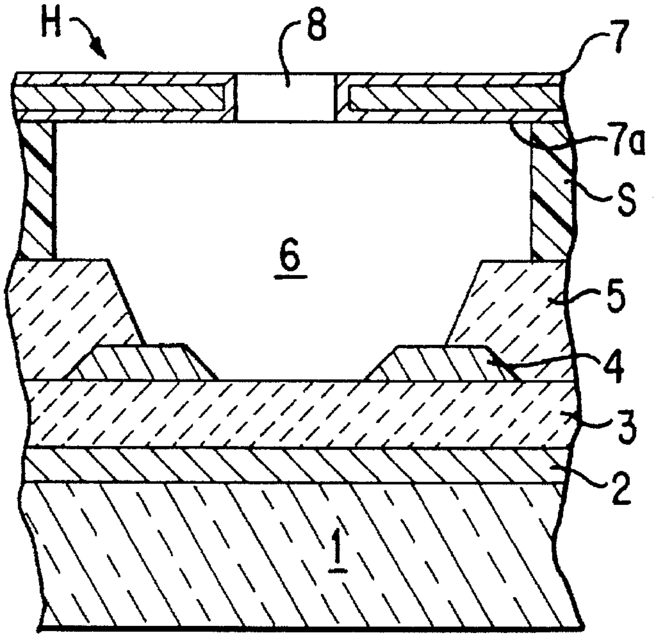
FIG. 3 is a schematic sectional view of an essential part of an electrostatic recording head fabricated in an example of the invention.

The general procedure of Example 1 was repeated except that a 30 μm thick stainless steel (18 chromium-8 nickel) foil which had been formed with a number of openings each with a diameter of 100 μm was subjected to electroplating to plate the foil with a 3 μm thick gold layer over the entire surfaces of the foil as is particularly shown in FIG. 3.

Figure 4:
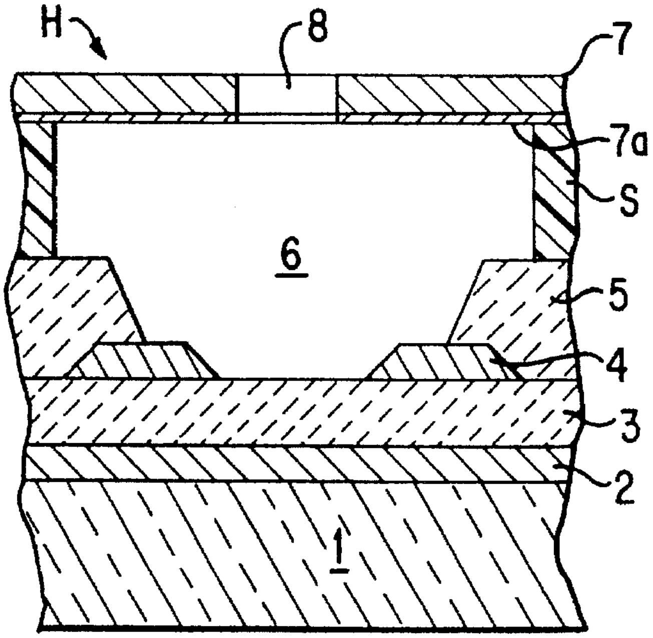
FIG. 4 is a view similar to FIG. 3 but inside surfaces of an opening of a screen electrode are not coated with an oxidation-resistant material for comparison.

FIG. 4 shows a screen electrode 7 for comparison. More particularly, the general procedure of Example 1 was repeated except that a 30 μm thick stainless steel (18 chromium-8 nickel) foil which had been formed with a number of openings each with a diameter of 100 μm was subjected to vacuum deposition to coat a 1000 angstroms thick gold layer *7a* only at the side of the screen electrode 7 which is facing the ion-generating space regions 6 as shown in FIG. 4.

The heads of FIGS. 3 and 4 were subjected to the confirmation test as in Example 1. As a result, it was found that when the screen electrode 7 was entirely coated with the gold as shown in FIG. 3, the relative opening ratio after the drive was substantially 100% and no clogging of the openings 8 took place.

In contrast, with the screen electrode 7 of FIG. 4 wherein the inner sides of individual openings 8 are not covered with gold, oxide corrosion products are deposited on the stainless steel, which is the underlying metal, at the inner sides of the openings 8. The relative opening ratio after the drive was reduced to not higher than 50%.

These results reveal that the screen electrode 7 should have a good corrosion resistance not only at the side facing the ion-generating space regions 6, but also the inner side of the openings 8.

Figure 5:
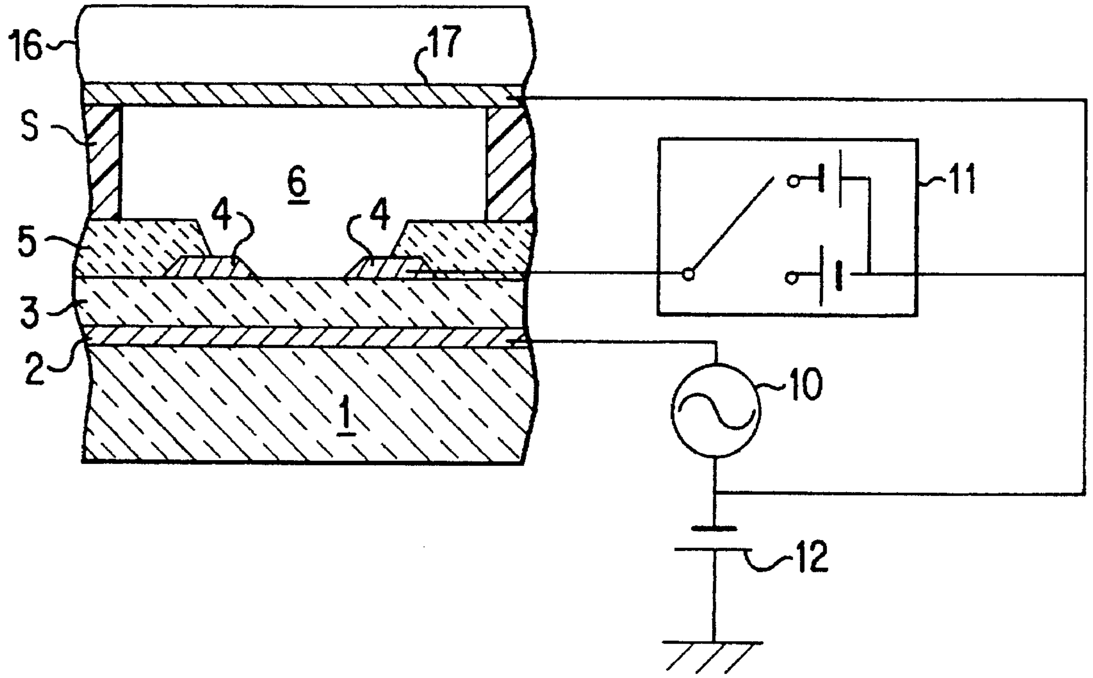
FIG. 5 is an illustrative view, partially in section, of an essential part of an electrostatic recording head used to Test Examples wherein a metallic foil having no opening is used in place of a screen electrode.

The following examples 10 to 14 deal with polymers and an inorganic compound applied as a surface member of a screen electrode. In these examples, the effect of the polymers and inorganic compound as the surface member is confirmed using a structure shown in FIG. 5 wherein a metal sheet having no opening is provided. A layer of each of the polymers and the inorganic compound is formed on one side of the metal sheet which is facing the ion generating space region.

EXAMPLE 10

The general procedure of Example 1 was repeated except that a metal sheet 16 having no opening was used instead of the screen electrode 7 and that a polyimide self-adhesive tape 17 was formed on the metal sheet 16 at a side which was in face-to-face relation with the ion generating space regions 6.

After the head was operated in the same manner as in example 1, the polyimide tape was observed through a light microscope. As a result, it was found that the portions exposed to the ion stream underwent discoloration, but there was found no blister based on a corrosion product which would cause the openings of the screen electrode to be clogged.

EXAMPLE 11

The general procedure of Example 10 was repeated except that a teflon (commercial name) self-adhesive tape was used instead of the polyimide self-adhesive tape in order to cover the side of the metal sheet which was facing the ion generating space regions 6.

In the same manner as in Example 10, the portions of the tape which was exposed to the ion steam after the drive were observed through a light microscope. As a result, it was found that the portions exposed to the ion stream underwent discoloration, but there was found no blister based on a corrosion product which would cause the openings of the screen electrode to be clogged.

EXAMPLE 12

The general procedure of Example 10 was repeated except that a polypropylene adhesive tape was used instead of the polyimide self-adhesive tape in order to cover the side of the metal sheet which was facing the ion generating space regions 6.

In the same manner as in Example 10, the portions of the tape exposed to the ion steam after the drive were observed through a light microscope. As a result, it was found that the portions exposed to the ion stream underwent discoloration, but there was found no blister based on a corrosion product which would cause the openings of the screen electrode to be clogged.

EXAMPLE 13

The general procedure of Example 10 was repeated except that a spray-coated born nitride layer was used instead of the polyimide self-adhesive tape in order to cover the side of the metal sheet which was facing the ion generating space regions 6.

In the same manner as in Example 10, the portions of the tape that were was exposed to the ion steam after the drive were observed through a light microscope. As a result, it was found that the portions exposed to the ion stream underwent no discoloration, and there was found no blister based on a corrosion product which would cause the openings of the screen electrode to be clogged.

EXAMPLE 14

The general procedure of Example 10 was repeated except that a siloxane polymer layer formed by dip coating was used instead of the polyimide self-adhesive tape in order to cover the side of the metal sheet which was facing the ion generating space regions 6.

In the same manner as in Example 10, the portions of the tape which was exposed to the ion steam after the drive were observed through a light microscope. As a result, it was found that the portions exposed to the ion stream underwent no discoloration, and there was found no blister based on a corrosion product which would cause the openings of the screen electrode to be clogged.

What is claimed is:

1. An electrostatic recording head which comprises, an insulating substrate having a multi-layered structure thereon, the multi-layered structure comprising, in the following order:

a plurality of first electrode strips having portions which are arranged in parallel to and separated from one another;

a first insulating layer;

a plurality of second electrode strips each extending to intersect with the first electrode strips thus creating individual intersected portions;

a second insulating layer in contact with said second electrode strips having a plurality of openings to form part of each of a plurality of ion generating space regions at individual intersected portions of said second electrode strips and said first electrode strips; and a screen electrode which is provided to complete each of said ion generating space regions in association with the second insulating layer and has a plurality of individual openings through which ions are passed, each said individual opening corresponding to one of the ion generating space regions, the individual openings defined by first and second segments of the screen electrode, wherein said first and second segments are perpendicular to a surface of the screen electrode facing said second electrodes, said screen electrode being made of a conductive or semiconductive core member and a surface layer formed at least on an entire surface of said core member which is facing the second electrodes and is exposed to charged particles and on the first and second segments of the screen electrode defining the individual openings, the surface layer being made of a material having a good oxidation resistance.

2. An electrostatic recording head according to claim 1, wherein said surface layer is formed on all surfaces of the core member.

3. An electrostatic recording head according to claim 1, wherein said surface layer is made of a member selected from the group consisting of metals, noble metals and alloys comprising a major proportion thereof, each having a melting point not lower than 1500° C.

4. An electrostatic recording head according to claim 1, wherein said surface layer is made of an inorganic compound selected from a group consisting of oxides, nitrides and carbides of metals and semiconductive metals, and mixtures thereof.

5. An electrostatic recording head according to claim 1, wherein said surface layer is made of polyolefin resins having such a structure wherein part or all of a number of hydrogen atoms of ethylene units of polyethylene are substituted with other elements or atomic groups, polyamide resins, polyimide resins, polyester resins, polyurethane resins and polyether resins.

6. An electrostatic recording head according to claim 1, wherein said surface layer is made of a metal alkoxide polymer.

7. An electrostatic recording head according to claim 1, further comprising a spacer provided between said second insulating layer and said screen electrode.

8. An electrostatic recording head according to claim 1, wherein said discharge electrode strips have each a forked shape.

9. An electrostatic recording head which comprises an insulating substrate having a multi-layered structure thereon, the multi-layered structure comprising, in the following order:

a plurality of first electrode strips having portions which are arranged in parallel to and separated from one another;

a first insulating layer;

a plurality of second electrode strips, each of said second electrode strips having a forked shape with at least two elongated projections extending from a common electrode portion, said second electrode strips extending to intersect with said first electrode strips thus creating individual intersected portions;

a second insulating layer having a plurality of openings to form part of each of a plurality ion generating space regions at individual intersected portions of said second electrode strips and said first electrode strips; and a screen electrode which is provided to complete each of said ion generating space regions in association with the second insulating layer and has a plurality of openings, through which ions are passed, corresponding to the ion generating space regions, said screen electrode being made of a member which is selected from a group consisting of metals, noble metals and alloys mainly composed of these metals and which has a melting point not lower than 1500° C.

* * * * *